US012378786B2

(12) United States Patent
Jablonsky

(10) Patent No.: US 12,378,786 B2
(45) Date of Patent: Aug. 5, 2025

(54) ANCHORS FOR PRECAST CONCRETE AND PRECAST CONCRETE HAVING ANCHORS

(71) Applicant: ALP Supply, Inc., Fairless Hills, PA (US)

(72) Inventor: David S. Jablonsky, Washington Crossing, PA (US)

(73) Assignee: ALP Supply, Inc., Fairless Hills, PA (US)

( * ) Notice: Subject to any disclaimer, the term of this patent is extended or adjusted under 35 U.S.C. 154(b) by 243 days.

(21) Appl. No.: 18/168,878

(22) Filed: Feb. 14, 2023

(65) Prior Publication Data

US 2024/0271439 A1 Aug. 15, 2024

(51) Int. Cl.
*E04G 21/14* (2006.01)
*B66C 1/66* (2006.01)

(52) U.S. Cl.
CPC ............ *E04G 21/142* (2013.01); *B66C 1/666* (2013.01)

(58) Field of Classification Search
CPC .................................................... E04G 21/142
See application file for complete search history.

(56) References Cited

U.S. PATENT DOCUMENTS 4,367,892 A * 1/1983 Holt ........................ B66C 1/666 294/82.31
4,386,486 A * 6/1983 Holt ........................ E04C 2/526 52/514
4,437,642 A * 3/1984 Holt ...................... E04G 21/142 52/125.4
4,615,554 A * 10/1986 Schilla .................... B66C 1/666 411/407

(Continued)

FOREIGN PATENT DOCUMENTS

CA 2931447 A1 11/2016
WO WO-2014185911 A1 * 11/2014 ............. B66C 1/666

OTHER PUBLICATIONS

European Search Report EP23157174 on Aug. 25, 2023.

*Primary Examiner* — Joshua K Ihezie
(74) *Attorney, Agent, or Firm* — Dority & Manning, P.A.

(57) ABSTRACT

Anchors and precast concrete structures including anchors are provided. An anchor includes a disk having a first dimension $D_1$, a second dimension $D_2$ and a first aspect ratio $[D_1/D_2]$, wherein $D_1$ and $D_2$ are oriented perpendicular with respect one another, and wherein the first aspect ratio $[D_1/D_2]$ is in a range between and including 0.75 and 1.25; and a head extending from a generally central portion of the disk in a direction generally perpendicular to $D_1$ and $D_2$, the head having a third dimension $D_3$, a fourth dimension $D_4$ and a second aspect ratio $[D_3/D_4]$, wherein $D_3$ and $D_4$ are oriented perpendicular with respect to one another, wherein $D_3$ is parallel with respect to $D_2$ and $D_4$ is parallel with respect to $D_1$, and wherein the second aspect ratio $[D_3/D_4]$ is less than 0.5.

17 Claims, 4 Drawing Sheets

(56) References Cited

U.S. PATENT DOCUMENTS

| | | | | | |
|---|---|---|---|---|---|
| 4,930,269 | A * | 6/1990 | Kelly | E04G 21/142 294/82.35 |
| 5,177,928 | A * | 1/1993 | Fricker | E04G 21/142 52/712 |
| 6,119,431 | A * | 9/2000 | Wakai | F16B 15/04 52/125.4 |
| D437,063 | S * | 1/2001 | Lancelot, III | D8/349 |
| D438,649 | S * | 3/2001 | Lancelot, III | D25/133 |
| D438,991 | S * | 3/2001 | Lancelot, III | D25/133 |
| 6,581,996 | B1 * | 6/2003 | Fromelius | B66C 1/666 52/704 |
| 6,647,674 | B1 * | 11/2003 | Lancelot, III | E04G 21/142 294/82.23 |
| D547,524 | S * | 7/2007 | Hansort | D34/35 |
| 8,640,399 | B2 * | 2/2014 | Fradera Pellicer | B28B 23/0062 52/125.4 |
| 8,875,471 | B2 * | 11/2014 | Siqueiros | E04B 1/3511 52/707 |
| 11,091,922 | B2 | 8/2021 | Kelly et al. | |
| 2003/0019169 | A1 * | 1/2003 | Francies, III | E04G 21/142 52/125.4 |
| 2003/0213206 | A1 * | 11/2003 | Hansort | E04B 1/41 52/715 |
| 2005/0044811 | A1 * | 3/2005 | Hansort | E04C 5/16 52/704 |
| 2007/0251169 | A1 * | 11/2007 | Dahl | E04B 1/483 52/301 |
| 2016/0347584 | A1 * | 12/2016 | Recker | E04G 21/142 |

* cited by examiner

ANCHORS FOR PRECAST CONCRETE AND PRECAST CONCRETE HAVING ANCHORS

FIELD

The present disclosure relates generally to structures for use with precast concrete, and more particularly to anchors for use in lifting precast concrete structures and precast concrete structures including anchors.

BACKGROUND

Precast concrete has been rapidly gaining recognition as a quick and cost-effective way to erect structures. Concrete structures have long been embraced for their strength and durability. However, traditional concrete structures require expensive construction workers be present at the construction site for pouring and forming the concrete, tight timing windows for the delivery of concrete slurry, and significant set up and cure times, among various other downsides. Additionally, limited designs can be created in situ at construction sites. For instance, bridge trusses are often formed from concrete beams made in complex formworks that are impractical to haul between construction sites.

Precast concrete structures eliminate these downsides as discrete portions of the structure are built off-site in controlled environments and shipped to the construction site ready for use. Once at the construction site, cranes and other lifting equipment are employed to raise the precast concrete structures into position. The lifting equipment utilizes cables which are attached to exposed connection points along the structures. These connection points must support the heavy load of the structures without compromising the functional integrity of the concrete and without hindering special considerations required for each structure, such as openings for windows or doors, relief areas, prestressed areas, and the like.

Accordingly, improved precast concrete structures and connection points for anchoring precast concrete structures to lifting equipment are desired in the art. In particular, anchors which provide increased load ratings, particularly in non-reinforced areas of concrete panels, would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, an anchor for lifting a precast concrete structure is provided. The anchor includes a disk having a first dimension $D_1$, a second dimension $D_2$ and a first aspect ratio $[D_1/D_2]$, wherein $D_1$ and $D_2$ are oriented perpendicular with respect one another, and wherein the first aspect ratio $[D_1/D_2]$ is in a range between and including 0.75 and 1.25; and a head extending from a generally central portion of the disk in a direction generally perpendicular to $D_1$ and $D_2$, the head having a third dimension $D_3$, a fourth dimension $D_4$ and a second aspect ratio $[D_3/D_4]$, wherein $D_3$ and $D_4$ are oriented perpendicular with respect to one another, wherein $D_3$ is parallel with respect to $D_2$ and $D_4$ is parallel with respect to $D_1$, and wherein the second aspect ratio $[D_3/D_4]$ is less than 0.5.

In accordance with another embodiment, a precast concrete structure is provided. The precast concrete structure includes a concrete body; and an anchor comprising: a disk having a first dimension $D_1$, a second dimension $D_2$ and a first aspect ratio $[D_1/D_2]$, wherein $D_1$ and $D_2$ are oriented perpendicular with respect one another, and wherein the first aspect ratio $[D_1/D_2]$ is in a range between and including 0.75 and 1.25; and a head extending from a generally central portion of the disk in a direction generally perpendicular to $D_1$ and $D_2$, the head having a third dimension $D_3$, a fourth dimension $D_4$ and a second aspect ratio $[D_3/D_4]$, wherein $D_3$ and $D_4$ are oriented perpendicular with respect to one another, wherein $D_3$ is parallel with respect to $D_2$ and $D_4$ is parallel with respect to $D_1$, and wherein the second aspect ratio $[D_3/D_4]$ is less than 0.5, wherein the disk is disposed within the concrete body, wherein a first portion of the head is disposed within the concrete body, and wherein a second portion of the head is exposed from the concrete body.

In accordance with another embodiment, a precast concrete structure is provided. The precast concrete structure includes a concrete body; reinforcing material disposed within the concrete body; and an anchor comprising: a disk having an outer edge with a continuously arcuate shape as seen from a top view; and a head extending from a generally central portion of the disk in a direction generally perpendicular to a first surface of the disk, wherein a cross-sectional profile of the head is substantially constant along at least 80% of a height of the head, wherein the disk is disposed within the concrete body, wherein a first portion of the head is disposed within the concrete body, wherein a second portion of the head is exposed from the concrete body, and wherein, as seen from a top view, the reinforcing material defines a reinforced area of the precast concrete structure and a non-reinforced area of the precast concrete structure, and wherein the anchor is disposed in the non-reinforced area.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
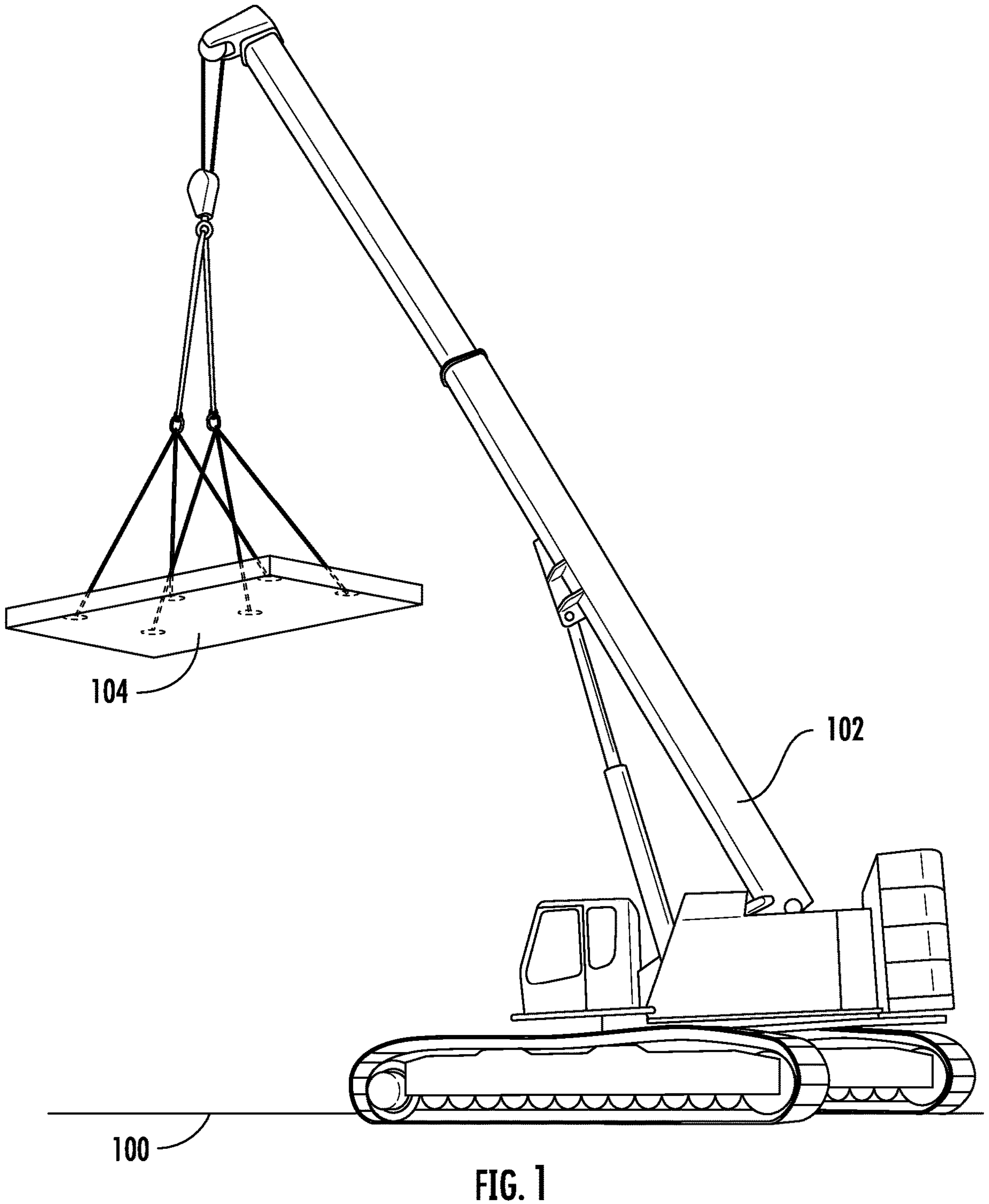
FIG. 1 is a view of a construction site in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises." "comprising." "includes," "including." "has." "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, anchors described herein and precast concrete structures using anchors described herein can exhibit increased maximum lifting capacities as compared to traditional designs without requiring the same amount of anchor penetration depth or the use of secondary reinforcing materials. Moreover, the anchors can abut low-density members (such as Styrofoam) which reduces manufacturing complexity. In an embodiment, an anchor described herein can include a disk and a head coupled to the disk, e.g., through a welded interface. The head can define a substantially constant cross-sectional shape as measured over the height of the head. The head can have a generally polygonal shape, as viewed from a side view. The disk can have a generally ovular shape, as viewed from a top view, with an outer edge of the disk being free of sharp corners. Anchors described herein have been discovered to improve lifting capacity without compromising on size or anchor penetration depth. These and other benefits of the anchors will become apparent to one of ordinary skill in the art after reading the entire disclosure.

Referring now to the drawings, FIG. 1 illustrates an exemplary construction site 100 where lifting equipment 102 is used to lift and move a precast concrete structure 104. In the depicted embodiment, the precast concrete structure 104 is a panel associated with a wall member. The shape, size and orientation of the precast concrete structure 104 may vary from that depicted in FIG. 1. For instance, by way of non-limiting example, the precast concrete structure 104 may be supported by the lifting equipment 102 in a vertical orientation rather than the horizontal orientation as shown. Moreover, the precast concrete structure 104 can be supported by a greater or lesser number of cables, i.e., anchor points. In certain instances, the precast concrete structure 104 can have a non-rectangular shape, e.g., in the case of precast concrete structures 104 not being used as part of wall members. The precast concrete structure 104 can have a different width, height, or thickness. Yet other modifications and variations are contemplated herein without limiting the scope of the disclosure.

Figure 2:
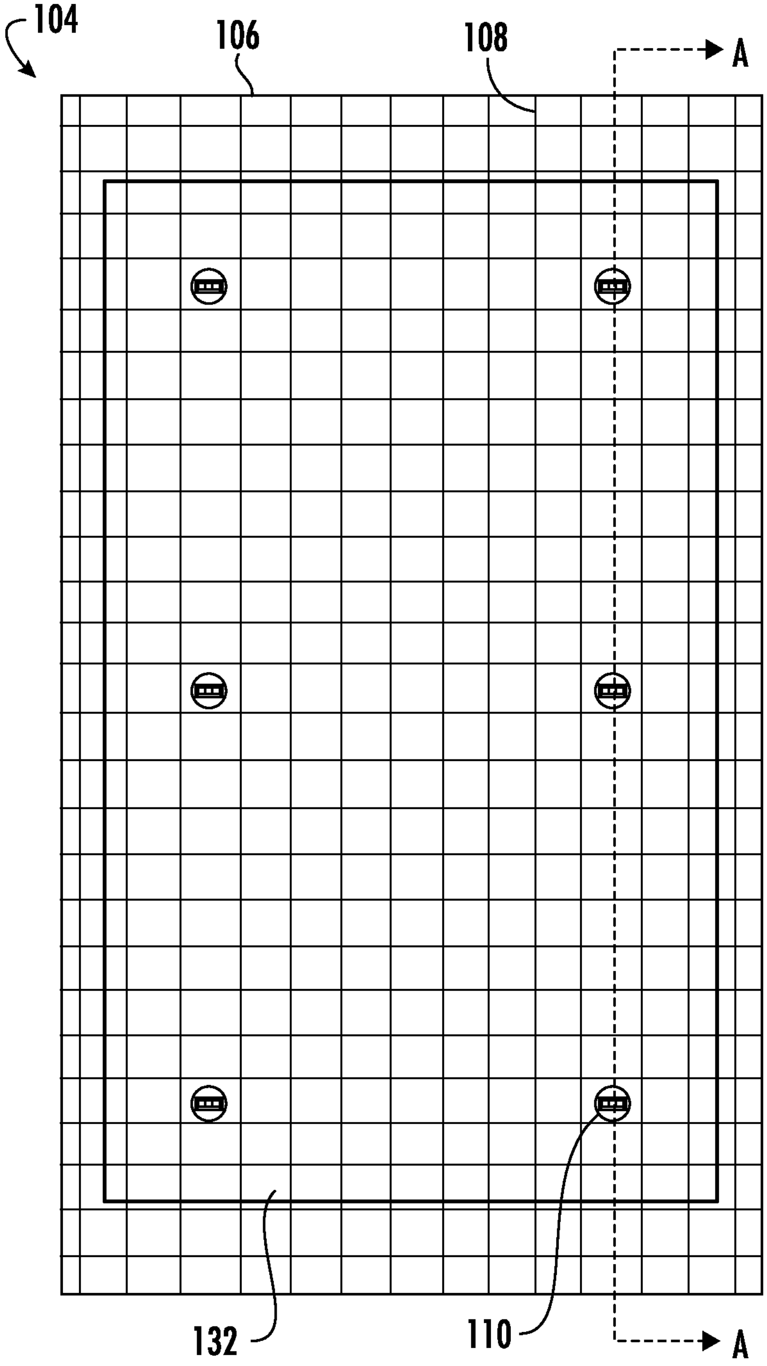
FIG. 2 is a schematic top view of a precast concrete structure in accordance with embodiments of the present disclosure.
Figure 3:
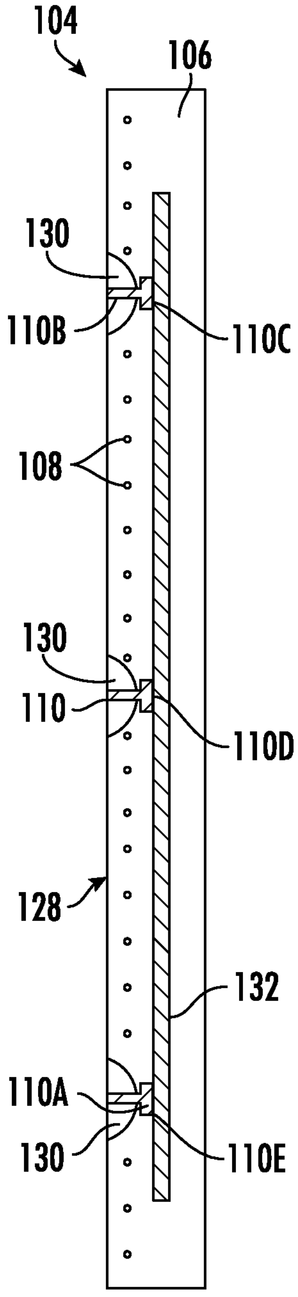
FIG. 3 is a schematic sideview view of the precast concrete structure in accordance with embodiments of the present disclosure as seen along Line A-A in FIG. 2.

FIG. 2 illustrates a schematic top view of the precast concrete structure 104 as seen in accordance with an exemplary embodiment. FIG. 3 illustrates a cross-sectional side view of the precast concrete structure 104 as seen in accordance with an embodiment along Line A-A in FIG. 2.

Referring to FIGS. 2 and 3, the precast concrete structure 104 can generally include a body 106, i.e., a precast body, formed from concrete. The body 106 defines a shape which can be formed in a formwork. By way of non-limiting example, the formwork can include a boundary structure forming an outer shape of the body 106. Disposed within the body 106 can be a reinforcing material 108. The reinforcing material 108 can be positioned in the formwork prior to introducing the concrete to the formwork. The reinforcing material 108 can include, for example, reinforcing bars, often referred to as rebar. In a particular embodiment, the reinforcing material 108 includes a plurality of rebar segments that are cut or bent to fit within the formwork in a desired pattern and joined together. Welded wire mesh can also, or alternatively, be used in the reinforcing material 108.

Figure 7:
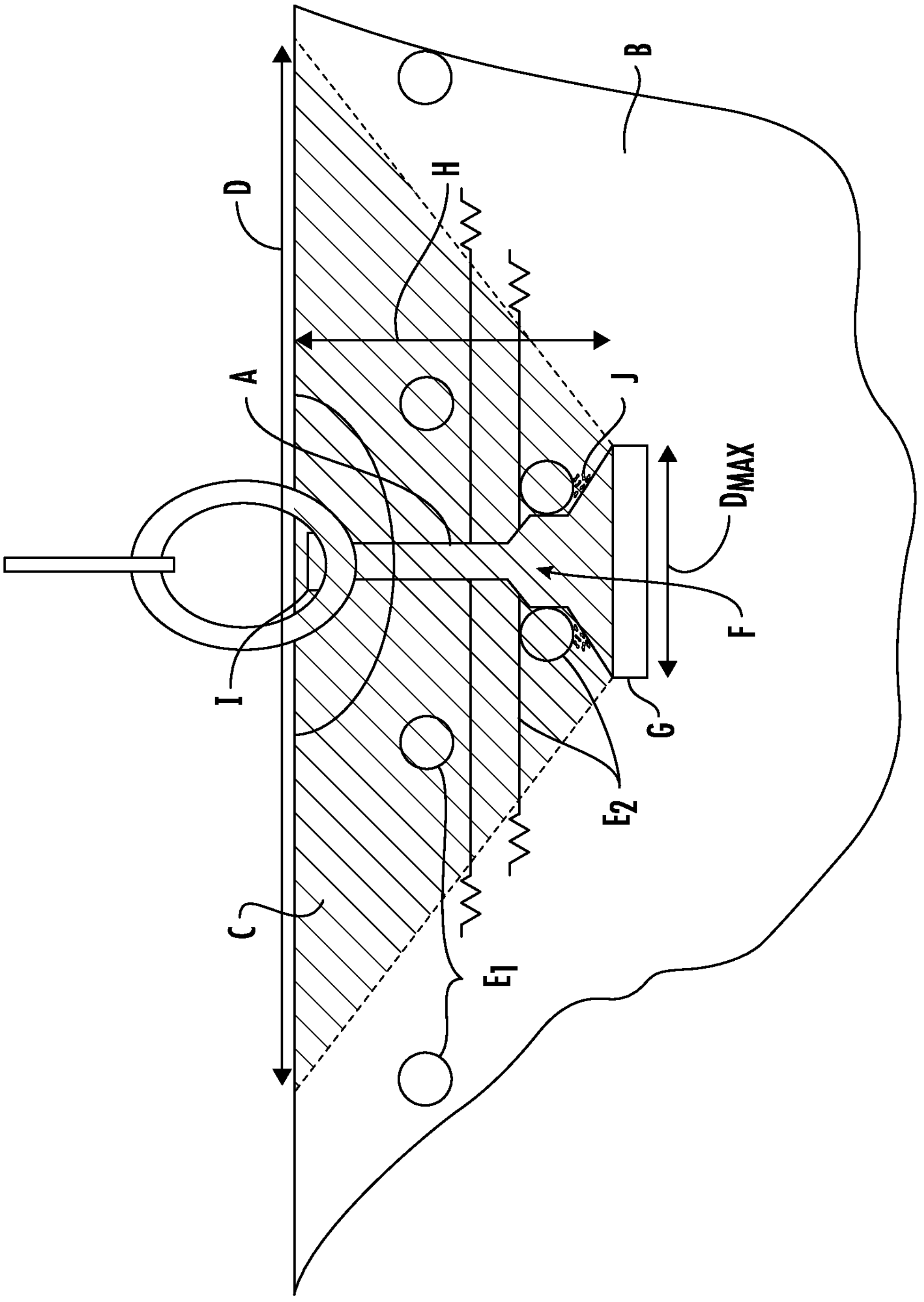
FIG. 7 is a cross-sectional schematic view of a precast concrete structure.

Anchors are known to break out of concrete when exposed to lifting loads beyond their lifting capacity. Break out occurs when force applied to an anchor exceeds maximum loading capacity, resulting in the anchor cracking the concrete. As force continues to be applied, the anchor pulls out of the concrete. FIG. 7 illustrates a cross-sectional view of an exemplary anchor A disposed in a precast concrete structure B in accordance with a traditional anchoring parameter. The break out area is represented by a shaded region C. When force on the anchor A exerted by a lifting arrangement exceeds the maximum lifting capacity, breakout occurs generally along the outer boundary of the shaded region C. This shaded region typically has a diameter D approximately equal to (1.5×height H)×2+$D_{MAX}$, where $D_{MAX}$ is a largest lateral dimension of the anchor A and H is the distance between the largest lateral dimension $D_{MAX}$ and the surface of the precast concrete structure B.

Reinforcing material $E_1$, such as rebar, is typically used in precast concrete structures B for distributing loading forces and accommodating tension within the precast concrete structure B. Traditional anchors A are positioned within gaps between the reinforcing material $E_1$. The anchors A do not contact the reinforcing material $E_1$. A secondary reinforcing material $E_2$, such as secondary rebar or welded wire mesh, is typically introduced to the precast concrete structure B. The gaps in the secondary reinforcing material $E_2$ are smaller than the gaps in the reinforcing material $E_1$. As described below, the anchor A uses the secondary reinforcing material $E_2$ to increase loading capacity. It should be understood that the reinforcing material $E_1$ may be used as described below to increase loading capacity.

To install traditional anchors A, the anchor A typically passes through an opening F formed by the secondary reinforcing material $E_2$ and is prevented from pulling through the opening F by an enlarged portion/head G of the anchor A positioned on an opposite side of the secondary reinforcing material $E_2$ from a lift point I. In this regard, traditional anchors A are at least partially held in place by the secondary reinforcing material $E_2$ during lifting operations. As a result, the secondary reinforcing material $E_2$ receives load directly from the anchor A. However, this arrangement is dangerous as the secondary reinforcing material $E_2$ has a tendency to float or drift from the traditional anchor A while the precast concrete structure B is formed and cures. As such, voids and gaps J often form between the enlarged head G of the anchor A and the secondary reinforcing material $E_2$ which introduces structural weaknesses into the precast concrete structure B. As lifting force is applied to the anchor A at the lift point I, the enlarged head G breaks up the concrete surrounding the voids and gaps J and, at best, causes the anchor A to impact the secondary reinforcing material $E_2$ to create micro-stresses and cracks in the precast concrete structure B. At worst, the enlarged head G can break through the opening F in the secondary reinforcing material $E_2$ and result in the precast concrete structure B falling and creating a significant hazard for nearby workers at the construction site.

Anchors 110 disclosed herein overcome these disadvantages. For example, anchors 110 disclosed herein can be used in precast concrete structures intentionally spaced apart from any and all reinforcing material 108 or $E_2$, thus reducing the formation of voids and gaps J which increase the chances of dangerous break out. This and other disadvantages of traditional anchors A are overcome by anchors 110 and precast concrete structures 104 using anchors 110 in accordance with embodiments described herein.

Figure 4:
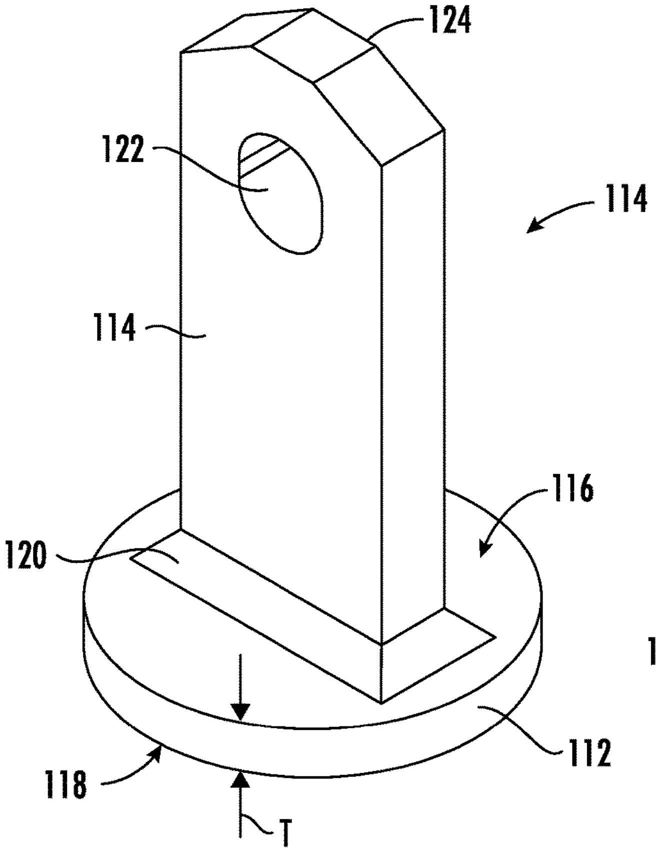
FIG. 4 is a perspective view of an anchor used in the precast concrete structure in accordance with embodiments of the present disclosure.

FIG. 4 illustrates a perspective view of an exemplary anchor 110 in accordance with an embodiment. The anchor 110 can be used with precast concrete structures 104 of various shapes and sizes to form a connection point for the lifting equipment 102 (FIG. 1) to raise and lower the precast concrete structure 104. The anchor 110 can generally include a disk 112 and a head 114. The disk 112 and the head 114 can include discrete components coupled together such that the head 114 is centered relative to the disk 112. The disk 112 can define a first surface 116 and a second surface 118 spaced apart from the first surface 116 by a thickness T. The head 114 can be coupled to the first surface 116 of the disk 112. For example, the head 114 can be welded to the first surface 116 of the disk 112. FIG. 4 depicts a welded interface 120 between the disk 112 and head 114.

The head 116 can further include an engagement 122, such as an opening extending through the head 114, whereby the lifting equipment 102 can engage the head 114 to lift the anchor 110. In an embodiment, the engagement 122 can be an opening having a generally arcuate shape, such as an ovular or circular shape for receiving attachment protocols of the lifting equipment. An end 124 of the head 114 opposite the welded interface 120 can define a multi-planar surface, such as a stepped surface or an arcuate surface, to allow the attachment protocol of the lifting equipment 102 to move (e.g., pivot) relative to the head 114 about an axis formed at the engagement 122. In this regard, the head 114 can accommodate a plurality of different lifting arrangements and configurations with the lifting equipment 102. For example, the anchor 110 can be utilized in a three-anchor set, a four-anchor set, a six anchor set, an eight-anchor set, or the like, where each anchor set has a different geometrical arrangement with respect to cables of the lifting equipment 102 and thus different angular considerations of the attachment protocol with respect therewith.

While various methods may be employed to form the anchor 110, in an embodiment, the anchor 110 can be formed by cutting the disk 112 and head 114 from one or more sheets of material, such as sheets of metal or metal alloy. In an embodiment, at least one of the disk 112 and the head 114 can be cut from a sheet of material by a plasma cutter, a water jet cutter, or the like. In another embodiment, at least one of the disk 112 and the head 114 can be stamped from a sheet of material. Once cut, the disk 112 and head 114 can be aligned with one another, e.g., using a jig, and held in place to be joined together. Alignment between the disk 112 and head 114 can occur, for example, when the head 114 is centrally disposed on the disk 112 and oriented perpendicular with respect to the disk 112. With the disk 112 and head 114 aligned, a machine or operator can then perform a joining operation such as applying a weld bead at an interface between the disk 112 and head 114, friction weld the disk 112 and head 114 together, adhere or chemical bond the disk 112 and head 114 together, applying a fastener, e.g., a threaded fastener, between the disk 112 and the head 114, use another joining technique, or any combination thereof. In certain instances, the anchor 110 may be heat treated, coated or galvanized for improved performance and corrosion resistance. In certain instances, the anchor 110 can receive indicia of an anchor rating along a surface thereof. For example, a machine (e.g., a press) can introduce a non-illustrated anchor rating into a side surface of the head 114 by pushing a die into the surface of the head 114. In an embodiment, the anchor rating can be disposed at the side surface of the head 114 in a portion of the head 114 that is exposed from the body 106 of the precast concrete structure 104 when positioned therein.

Figure 5:
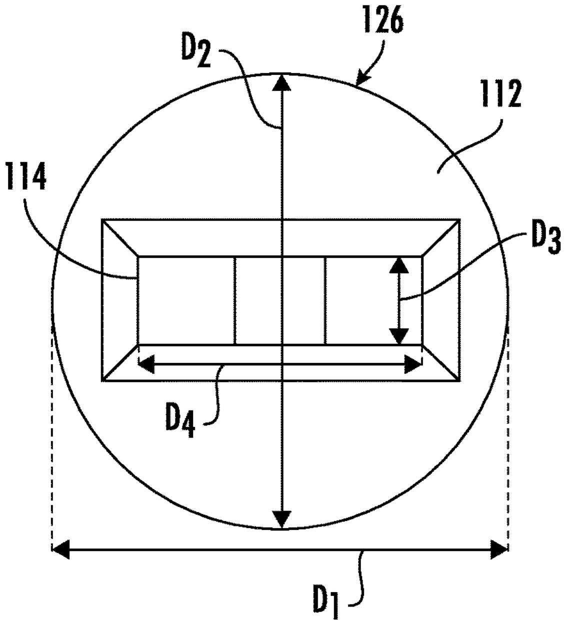
FIG. 5 is a top view of the anchor used in the precast concrete structure in accordance with embodiments of the present disclosure.

FIG. 5 is a top view of the anchor 110. As depicted in FIG. 5, the disk 112 has a first dimension $D_1$ and a second dimension $D_2$ oriented perpendicular with respect to one another. The first and second dimensions $D_1$ and $D_2$ can define a first aspect ratio [$D_1/D_2$] of the disk 112 in a range between and including 0.75 and 1.25, such as in a range between and including 0.8 and 1.2, such as in a range between and including 0.85 and 1.15, such as in a range between and including 0.9 and 1.1, such as in a range between and including 0.95 and 1.05. In a particular embodiment, the first aspect ratio [$D_1/D_2$] can be approximately 1.0.

In an embodiment, the disk 112 can include an outer edge 126 having a continuously arcuate shape as seen from a top view of the anchor 110. In this regard, the disk 112 can be free of corners, as viewed from a top view. Inclusion of corners at the outer edge 126 results in high point loads in the concrete and increases the likelihood of the precast concrete structure 104 cracking when lifted by the anchor 110. Anchors 110 having disks 112 with continuously arcuate shapes, as seen from the top view of the anchor 110, and aspect ratios in a range between and including 0.75 and 1.25 may provide significantly increased lifting capacities as compared to anchors without such shaped disks.

In a particular embodiment, the disk 112 can have an ovular shape as viewed from a top view of the anchor 110. In a more particular embodiment, the disk 112 can have a circular shape as viewed from a top view of the anchor 110.

In an embodiment, the thickness T of the disk 112 can be in a range between and including 0.05 $D_1$ and 0.2 $D_1$. In another embodiment, the thickness T of the disk 112 can be in a range between and including 0.05 $D_2$ and 0.2 $D_2$. In a more particular embodiment, the thickness T of the disk 112 can be approximately 0.125 $D_1$ or approximately 0.125 $D_2$. Disks 112 with thicknesses T in a range between 0.05 $D_1$ and 0.2 $D_1$ or in a range between 0.05 $D_2$ and 0.2 $D_2$ have been shown to exhibit high structural rigidity and strength. This allows for use of the anchor 110 in precast concrete structures 104 with small penetration depths where bigger anchors would be disposed too close to a back surface of the body 106.

The head 114 can have a third dimension $D_3$ and a fourth dimension $D_4$ oriented perpendicular with respect to one another. The third dimension $D_3$ may be oriented parallel with respect to the second dimension $D_2$ of the disk 112 and the fourth dimension $D_4$ may be oriented parallel with respect to the first dimension $D_1$ of the disk 112. The third and fourth dimensions $D_3$ and $D_4$ can define a second aspect ratio [$D_3/D_4$] of the anchor 110 of less than 0.75, such as less than 0.7, such as less than 0.65, such as less than 0.6, such as less than 0.55, such as less than 0.5, such as less than 0.49, such as less than 0.48, such as less than 0.47, such as less than 0.46, such as less than 0.45. In an embodiment, the second aspect ratio [$D_3/D_4$] can be in a range between and including 0.2 and 0.45, such as in a range between and including 0.23 and 0.44, such as in a range between and including 0.26 and 0.43, such as in a range between and including 0.30 and 0.42. In an embodiment, the second aspect ratio [$D_3/D_4$] can be in a range between and including 0.3 and 0.45.

Anchors 110 having heads 114 with aspect ratios within the ranges described above may provide significantly increased lifting capacities as compared to anchors without heads within the described ranges. Without wishing to be bound by any particular theory, it is believed that aspect ratios of less than 1.0, and more particularly, aspect ratios of less than 0.5, may increase the holding effect of the anchor 110 within the body 106 by increasing the volume of concrete located within a cylindrical space defined by a boundary of the outer edge 126 of the disk 112 and a major surface 128 (FIG. 3) of the body 106 without compromising on strength of the head 114, i.e., without reducing tensile strength of the head 114.

In an embodiment, the head 114 can have a generally polygonal shape, e.g., a rectangular shape, when viewed from a top view. By forming a continuously arcuate shape in the outer edge 126 of the disk 112 having a first aspect ratio in a range of 0.75 and 1.25 and by using a generally polygonal shape for the head 114, a distance between the outer edge 126 of the disk 112 and a nearest location along the head 114 varies at each location around the circumference of the anchor 110. That is, the distance between the outer edge 126 and a nearest location along the head 114 varies with each relative angular displacement around the anchor 110. For example, the anchor 110 can define a third aspect ratio [$D_1/D_4$] in a range between and including 1.5 and 2.5, and a fourth aspect ratio [$D_2/D_3$] in a range between and including 4.5 and 8.0.

Third and fourth aspect ratios of traditional anchors are typically similar to one another. Differences between the third and fourth aspect ratios as compared to one another have traditionally been thought to create localized stress points within concrete as lifting forces were thought to transfer unevenly around the circumference of the anchor. For example, unequal flexure of the anchor within the body of the precast concrete structure in one direction but not in the perpendicular direction in a lateral plane (resulting from unequal third and fourth aspect ratios), was traditionally thought to both create large bending moments and thus crack the concrete in one direction while also creating small load areas in the other direction resulting in localized crushing of the concrete. Approximately equal third and fourth aspect ratios were thus thought to solve this problem. However, use of the aspect ratios and relative dimensions described herein have been unexpectedly discovered to mitigate this undesirable uneven force distribution while simultaneously increasing the maximum lifting capacity of the anchor 110 as compared to traditional lifting structures.

Figure 6:
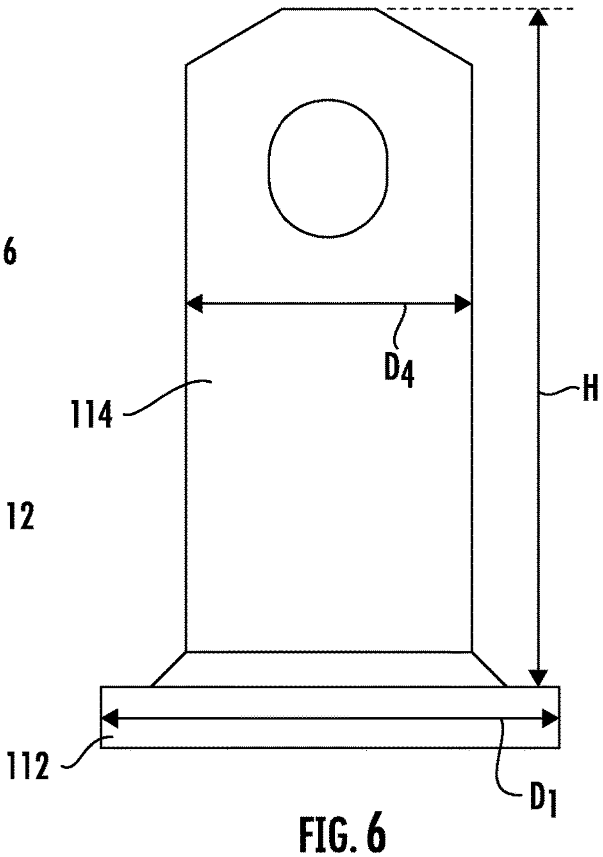
FIG. 6 is a side view of the anchor used in the precast concrete structure in accordance with embodiments of the present disclosure.

FIG. 6 is a side view of the anchor 110 in accordance with an embodiment. As depicted, the head 114 of the anchor 110 defines a height H, as measured between opposite ends thereof. In an embodiment, at least one, such as both, of the third and fourth dimensions $D_3$ and $D_4$ of the head 114 may be substantially constant, i.e., uniform, along at least 50% of the height H, such as along at least 55% H, such as along at least 60% H, such as along at least 65% H, such as along at least 70% H, such as along at least 75% H. In a more particular embodiment, the third and fourth dimensions $D_3$ and $D_4$ of the head 114 may be substantially constant along at least 80% H, such as along at least 85% H, such as along at least 90% H, such as along at least 95% H. Without wishing to be bound by any particular theory, it is believed that anchors 110 with heads 114 having substantially constant dimensions $D_3$ and $D_4$ along significant portions of their heights H (i.e., greater than 50% of H, such as greater than 80% of H) can exhibit increased strength and performance as compared to heads with more variable dimensions as force is transferred through the head 114 to the disk 112 in a more uniform distribution and thus applied to the body 106 more evenly.

In an embodiment, at least one of $H/D_1$ and $H/D_2$ can be less than 2, such as less than 1.95, such as less than 1.9, such as less than 1.85, such as less than 1.8, such as less than 1.75. Greater penetration depth of the anchors within the body 106 of the precast concrete structure 104 is known to increase load capacity. However, in certain instances, use of a deep penetrating anchor is undesirable. For example, it may not be desirable for the anchor to penetrate deep into thin precast panels where the anchor may be disposed adjacent to the back surface of the panel. Use of an anchor having a height to depth ratio [$H/D_1$ or $H/D_2$] of less than 2 was traditionally undesirable for this reason. However, anchors 110 in accordance with embodiments disclosed herein allow for smaller height to depth ratios (e.g., less than 2, such as less than 1.9, such as less than 1.8, such as less than 1.7) without compromising load capacity C as a result of the unexpected force distribution obtained using the anchor 110 described herein.

Load capacity C is defined as the loading capacity an anchor can support when properly installed within a precast concrete structure. Anchors 110 described herein are load tested spaced apart from reinforcing material $E_1$ and without the use of any secondary reinforcing material $E_2$ (FIG. 7). In an embodiment, the anchor 110 described herein can define a maximum load capacity C to height H ratio [C/H] of at least 6750 lbs/inch, such as at least 6800 lbs/inch, such as at least 6850 lbs/inch, such as at least 6900 lbs/inch, such as at least 7000 lbs/inch, such as at least 7250 lbs/inch, such as at least 7500 lbs/inch, such as at least 8000 lbs/inch. That is, anchors 110 described herein may advantageously provide high load capacity C. Moreover, the anchors 110 can provide high load capacity C using heads 114 with relatively short heights H and thus relatively shallow anchor penetration and without secondary reinforcing material $E_2$.

Referring again to FIG. 3, the anchor 110 can be partially disposed within the body 106 of the precast concrete structure 104 such that a first portion 110A of the anchor 110 is disposed within the body 106 and a second portion 110B of the anchor 110 is exposed from the body 106. The first portion 110A of the anchor 110 can include the disk 112 and a portion of the head 114. The second portion 110B of the anchor 110 can include another portion of the head 114. For example, as depicted in FIG. 3, the body 106 defines a major surface 128 (i.e., a top surface during formation of the precast concrete structure 104 in the formwork) including recesses 130. The recesses 130 can each form a concaved surface which exposes the second portions 110B of the anchors 110 such that attachment protocol of the lifting equipment 102 can access and engage the engagement 122 of the head 114. In such a manner, the anchor 110 may not extend past the major surface 128 of the body 106.

In an embodiment, all anchors 110 disposed in the precast concrete structure 104 can share a common height. For example, referring to FIG. 3, a first anchor 110C, a second anchor 110D and a third anchor 110E can all share a common height and penetrate a common distance into the body 106 from the major surface 128. The anchors 110C, 110D and 110E can all be spaced apart from the major surface 128 by a same distance or all be flush with the major surface 128. In other embodiments, anchors 110 with different heights H may be used in the same body 106. For example, the first anchor 110C can extend a first depth into the body 106, as measured from the major surface 128, the second anchor 110D can extend a second depth into the body 106, as measured from the major surface 128, and the third anchor 110E can extend a third depth into the body 106, as measured from the major surface 128. The first, second, and third depths can be different from one another while the top of the anchors 110C, 110D and 110E can all be spaced apart from the major surface 128 by a same distance or all be flush with the major surface 128.

In some instances, at least one of the anchors 110 can be disposed adjacent to a non-concrete member, such as a low-density member 132. The low-density member 132 can have a relatively lower density as compared to the surrounding concrete of the body 106. By way of non-limiting example, the low-density member 132 can include Styrofoam embedded (e.g., fully embedded) within the body 106. As illustrated in FIGS. 2 and 3, the low-density member 132 may be disposed at a vertical elevation below the reinforcing material 108. In another embodiment, the low-density member 132 can be disposed at the same elevation as the reinforcing material 108. In yet another embodiment, the low-density member 132 can be disposed at least partially above the reinforcing material 108. The anchor 110 can extend from the low-density member 132 towards the major surface 128 of the body 106. In an embodiment, the second surface 118 (FIG. 4) of the disk 112 can abut the low-density member 132. For example, during formation of the precast concrete structure 104, one or more of the anchors 110 may be positioned on the low-density member 132. As concrete is introduced into the formwork, the low-density member 132 can remain at a fixed location and support the anchor 110. Alternatively, the anchor 110 can be inserted into the body 106 while the concrete is soft and pushed into the body 106 until contacting the low-density member 132.

Referring again to FIGS. 2 and 3, in an embodiment the anchor 110 can include a plurality of anchors 110, such as at least two anchors 110, at least three anchors 110, at least four anchors 110, at least five anchors 110, at least six anchors 110, at least seven anchors 110, or at least eight anchors 110. Each of the plurality of anchors 110 can be disposed on the low-density members 132. In an embodiment, the anchors 110 can be arranged in one or more rows and columns to form a grid. In another embodiment, the anchors 110 may be staggered, arranged in yet a different pattern, or randomly positioned. The anchors 110 may be oriented in a same generally orientation as one another, i.e., the lifting engagements 122 of each anchor 110 can be aligned with respect to one another.

Anchors 110 and precast concrete structures 104 utilizing anchors 110 described in accordance with one or more embodiments herein exhibit increased lifting capacities C without requiring deep anchor penetration or reinforcing material 108 at the immediate anchor site. Additionally, anchors 110 described herein can be utilized without secondary reinforcing material $E_2$ (FIG. 7) on top of the disk 112 to prevent break out of the anchor 110.

Further aspects of the invention are provided by one or more of the following embodiments:

Embodiment 1. An anchor for lifting precast concrete, the anchor comprising: a disk having a first dimension $D_1$, a second dimension $D_2$ and a first aspect ratio $[D_1/D_2]$, wherein $D_1$ and $D_2$ are oriented perpendicular with respect one another, and wherein the first aspect ratio $[D_1/D_2]$ is in a range between and including 0.75 and 1.25; and a head extending from a generally central portion of the disk in a direction generally perpendicular to $D_1$ and $D_2$, the head having a third dimension $D_3$, a fourth dimension $D_4$ and a second aspect ratio $[D_3/D_4]$, wherein $D_3$ and $D_4$ are oriented perpendicular with respect to one another, wherein $D_3$ is parallel with respect to $D_2$ and $D_4$ is parallel with respect to $D_1$, and wherein the second aspect ratio $[D_3/D_4]$ is less than 0.5.

Embodiment 2. The anchor of embodiment 1, wherein the disk comprises an outer edge having a continuously arcuate shape as seen from a top view of the anchor.

Embodiment 3. The anchor of embodiment 2, wherein the disk defines an arcuate shape as seen from a top view of the anchor, and wherein the head defines a polygonal shape as seen from a top view of the anchor.

Embodiment 4. The anchor of embodiment 1, wherein $D_3$ and $D_4$ are substantially constant along at least 80% of a height of the head.

Embodiment 5. The anchor of embodiment 1, wherein the head defines a height H, and wherein $H/D_1$ or $H/D_2$ is less than 1.75.

Embodiment 6. The anchor of embodiment 5, wherein the anchor defines a maximum load capacity C, as measured in a precast concrete structure, and wherein C/H is at least 6750 lbs/inch with the anchor spaced apart from any reinforcing material in the precast concrete structure.

Embodiment 7. The anchor of embodiment 1, wherein the first aspect ratio $[D_1/D_2]$ is approximately 1.0.

Embodiment 8. The anchor of embodiment 4, wherein the second aspect ratio $[D_3/D_4]$ is in a range between and including 0.2 and 0.45.

Embodiment 9. The anchor of embodiment 1, wherein a third aspect ratio $[D_1/D_4]$ is in a range between and including 1.5 and 2.5, and wherein a fourth aspect ratio $[D_2/D_3]$ is in a range between and including 4.5 and 8.0.

Embodiment 10. The anchor of embodiment 1, wherein the head is coupled to the disk at a welded interface.

Embodiment 11. A precast concrete structure comprising: a concrete body; and an anchor comprising: a disk having a first dimension $D_1$, a second dimension $D_2$ and a first aspect ratio $[D_1/D_2]$, wherein $D_1$ and $D_2$ are oriented perpendicular with respect one another, and wherein the first aspect ratio $[D_1/D_2]$ is in a range between and including 0.75 and 1.25; and a head extending from a generally central portion of the disk in a direction generally perpendicular to $D_1$ and $D_2$, the head having a third dimension $D_3$, a fourth dimension $D_4$ and a second aspect ratio $[D_3/D_4]$, wherein $D_3$ and $D_4$ are oriented perpendicular with respect to one another, wherein $D_3$ is parallel with respect to $D_2$ and $D_4$ is parallel with respect to $D_1$, and wherein the second aspect ratio $[D_3/D_4]$ is less than 0.5, wherein the disk is disposed within the concrete body, wherein a first portion of the head is disposed within the concrete body, and wherein a second portion of the head is exposed from the concrete body.

Embodiment 12. The precast concrete structure of embodiment 11, wherein the precast concrete structure comprises a reinforcing material, and wherein the anchor is spaced apart from the reinforcing material.

Embodiment 13. The precast concrete of embodiment 12, wherein the disk comprises an outer edge having a continuously arcuate shape as seen from a top view.

Embodiment 14. The precast concrete structure of embodiment 11, wherein the anchor defines a maximum load capacity C, as measured in a precast concrete structure, wherein the anchor defines a height H, and wherein C/H is at least 6750 lbs/inch with the anchor spaced apart from any reinforcing material in the precast concrete structure.

Embodiment 15. The precast concrete structure of embodiment 11, wherein the disk comprises a first surface and a second surface spaced apart from one another by a thickness of the disk, wherein the head extends from the first surface, and wherein the second surface of the disk abuts a low-density member embedded in the concrete body.

Embodiment 16. A precast concrete structure comprising: a concrete body; reinforcing material disposed within the concrete body; and an anchor comprising: a disk having an outer edge with a continuously arcuate shape as seen from a top view; and a head extending from a generally central portion of the disk in a direction generally perpendicular to a first surface of the disk, wherein a cross-sectional profile of the head is substantially constant along at least 80% of a height of the head, wherein the disk is disposed within the concrete body, wherein a first portion of the head is disposed within the concrete body, wherein a second portion of the head is exposed from the concrete body, and wherein the anchor is spaced apart from the reinforcing material.

Embodiment 17. The precast concrete structure of embodiment 16, wherein the disk defines a first dimension $D_1$, a second dimension $D_2$ and a first aspect ratio $[D_1/D_2]$, wherein $D_1$ and $D_2$ are oriented perpendicular with respect one another, wherein the first aspect ratio $[D_1/D_2]$ is in a range between and including 0.75 and 1.25, wherein the head defines a third dimension $D_3$, a fourth dimension $D_4$ and a second aspect ratio $[D_3/D_4]$, $D_3$ and $D_4$ are oriented perpendicular with respect to one another, wherein $D_3$ is parallel with respect to $D_2$ and $D_4$ is parallel with respect to $D_1$, and wherein the second aspect ratio $[D_3/D_4]$ is in a range between and including 0.3 and 0.45.

Embodiment 18. The precast concrete structure of embodiment 16, wherein the disk has a circular shape, as seen from a top view, wherein the head has a polygonal shape, as seen from a top view, and wherein the second aspect ratio $[D_3/D_4]$ is constant along at least 80% of a height of the head.

Embodiment 19. The precast concrete structure of embodiment 16, wherein the disk further comprises a second surface spaced apart from the first surface by a thickness of the disk, and wherein the second surface of the disk abuts a low-density member embedded in the concrete body.

Embodiment 20. The precast concrete structure of embodiment 16, wherein the anchor defines a maximum load capacity C, as measured in the precast concrete structure, wherein the anchor defines a height H, and wherein C/H is at least 6750 lbs/inch with the anchor spaced apart from any reinforcing material in the precast concrete structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An anchor for lifting precast concrete, the anchor comprising:

a disk having a first dimension $D_1$, a second dimension $D_2$ and a first aspect ratio $[D_1/D_2]$, wherein $D_1$ and $D_2$ are oriented perpendicular with respect to one another, and wherein the first aspect ratio $[D_1/D_2]$ is in a range between and including 0.75 and 1.25; and a head extending from a generally central portion of the disk in a direction generally perpendicular to $D_1$ and $D_2$, the head having a third dimension $D_3$, a fourth dimension $D_4$ and a second aspect ratio $[D_3/D_4]$, wherein $D_3$ and $D_4$ are oriented perpendicular with respect to one another, wherein $D_3$ is parallel with respect to $D_2$ and $D_4$ is parallel with respect to $D_1$, wherein the second aspect ratio $[D_3/D_4]$ is less than 0.5, wherein the head defines a height H, wherein $H/D_1$ or $H/D_2$ is less than 1.75, wherein the anchor defines a maximum load capacity C, as measured in a precast concrete structure, and wherein C/H is at least 6750 lbs/inch with the anchor spaced apart from any reinforcing material in the precast concrete structure.

2. The anchor of claim 1, wherein the disk comprises an outer edge having a continuously arcuate shape as seen from a top view of the anchor.

3. The anchor of claim 2, wherein the disk defines an arcuate shape as seen from a top view of the anchor, and wherein the head defines a polygonal shape as seen from a top view of the anchor.

4. The anchor of claim 1, wherein $D_3$ and $D_4$ are substantially constant along at least 80% of a height of the head.

5. The anchor of claim 1, wherein the disk defines a constant thickness.

6. The anchor of claim 1, wherein the head extends from the disk to an end, wherein the end defines a flat surface perpendicular to the height H, and wherein the flat surface is separated from opposite side surfaces of the head by chamfered portions, the chamfered portions directly abutting the flat surface and the side surfaces.

7. The anchor of claim 1, wherein the first aspect ratio $[D_1/D_2]$ is approximately 1.0.

8. The anchor of claim 4, wherein the second aspect ratio $[D_3/D_4]$ is in a range between and including 0.2 and 0.45.

9. The anchor of claim 1, wherein a third aspect ratio $[D_1/D_4]$ is in a range between and including 1.5 and 2.5, and wherein a fourth aspect ratio $[D_2/D_3]$ is in a range between and including 4.5 and 8.0.

10. The anchor of claim 1, wherein the head is coupled to the disk at a welded interface.

11. A precast concrete structure comprising:
a concrete body; and
an anchor comprising:
a disk having a first dimension $D_1$, a second dimension $D_2$ and a first aspect ratio $[D_1/D_2]$, wherein $D_1$ and $D_2$ are oriented perpendicular with respect to one another, and wherein the first aspect ratio $[D_1/D_2]$ is in a range between and including 0.75 and 1.25; and
a head extending from a generally central portion of the disk in a direction generally perpendicular to $D_1$ and $D_2$, the head having a third dimension $D_3$, a fourth dimension $D_4$ and a second aspect ratio $[D_3/D_4]$, wherein $D_3$ and $D_4$ are oriented perpendicular with respect to one another, wherein $D_3$ is parallel with respect to $D_2$ and $D_4$ is parallel with respect to $D_1$, and wherein the second aspect ratio $[D_3/D_4]$ is less than 0.5,
wherein the disk is disposed within the concrete body,
wherein a first portion of the head is disposed within the concrete body,
wherein a second portion of the head is exposed from the concrete body, and
wherein the anchor defines a maximum load capacity C, as measured in a precast concrete structure, wherein the anchor defines a height H, and wherein C/H is at least 6750 lbs/inch with the anchor spaced apart from any reinforcing material in the precast concrete structure.

12. The precast concrete of claim 11, wherein the disk comprises an outer edge having a continuously arcuate shape as seen from a top view.

13. The precast concrete structure of claim 11, wherein the disk comprises a uniform thickness, and wherein the head is coupled to the disk at a welded interface.

14. The precast concrete structure of claim 11, wherein the disk comprises a first surface and a second surface spaced apart from one another by a thickness of the disk, wherein the head extends from the first surface, and wherein the second surface of the disk abuts a low density member embedded in the concrete body.

15. The precast concrete structure of claim 11, wherein the second portion of the head defines a flat surface perpendicular to the height H, and wherein the flat surface is separated from opposite side surfaces of the head by chamfered portions, the chamfered portions directly abutting the flat surface and the side surfaces.

16. The precast concrete structure of claim 11, wherein a third aspect ratio $[D_1/D_4]$ is in a range between and including 1.5 and 2.5, and wherein a fourth aspect ratio $[D_2/D_3]$ is in a range between and including 4.5 and 8.0.

17. The precast concrete structure of claim 11, wherein $D_3$ and $D_4$ are substantially constant along at least 80% of a height of the head.

* * * * *